US00RE44422E

(19) United States
(12) Reissued Patent
Labonté et al.

(10) Patent Number: US RE44,422 E
(45) Date of Reissued Patent: Aug. 13, 2013

(54) ICE SKATE BLADE

(75) Inventors: Ivan Labonté, Montreal (CA); Chris Langevin, Prevost (CA); François Chenevert, Rock Forest (CA)
(73) Assignee: Bauer Hockey, Inc., Exeter, NH (US)

(21) Appl. No.: 29/319,823

(22) Filed: Jun. 16, 2008

Related U.S. Patent Documents

Reissue of:
(64) Patent No.: Des. 488,846
Issued: Apr. 20, 2004
Appl. No.: 29/159,672
Filed: Apr. 26, 2002

U.S. Applications:
(60) Continuation of application No. 29/291,691, filed on Sep. 21, 2007, now abandoned, which is a division of application No. 29/213,958, filed on Sep. 23, 2004, now abandoned.

(51) LOC (9) Cl. ..... 21-02
(52) U.S. Cl.
USPC ..... D21/761
(58) Field of Classification Search
USPC ..... D21/760–764, 771; 280/11.18, 11.12, 280/11.19, 11.22
See application file for complete search history.

(56) References Cited

U.S. PATENT DOCUMENTS 475,650 A 5/1892 Wierda et al.
2,414,967 A 1/1947 Meyers (Continued)

FOREIGN PATENT DOCUMENTS

CA 1325819 C 1/1994
CA 2145520 A1 4/1994

(Continued)

OTHER PUBLICATIONS

Illustration of an ice skate blade bolder and an ice skate blade sold under the trademark "TBLADE".

*Primary Examiner* — Raphael Barkai
(74) *Attorney, Agent, or Firm* — Wolf, Greenfield & Sacks, P.C.

(57) CLAIM

We claim the ornamental design for the ice skate blade, as shown and described.

DESCRIPTION

Figure 8:
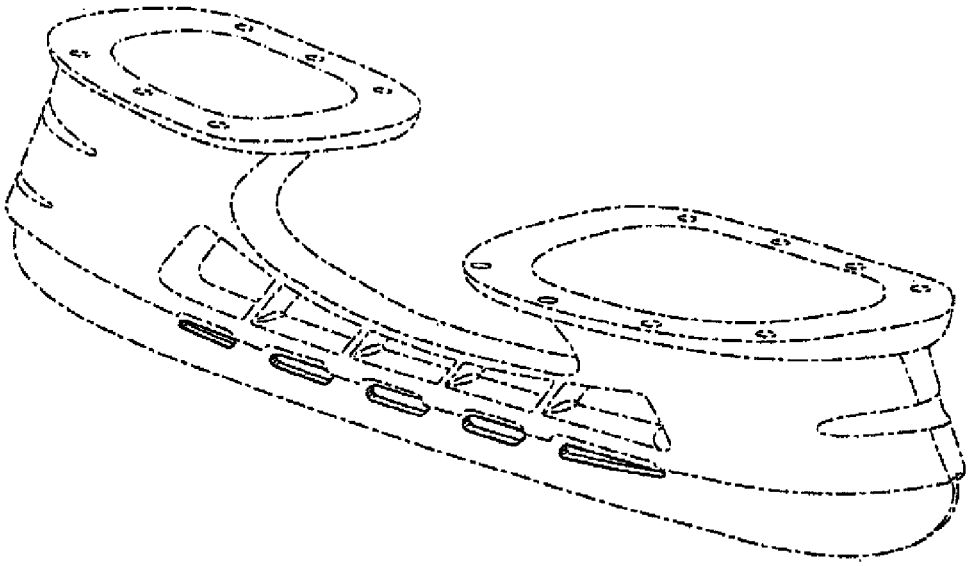
Figure 10:
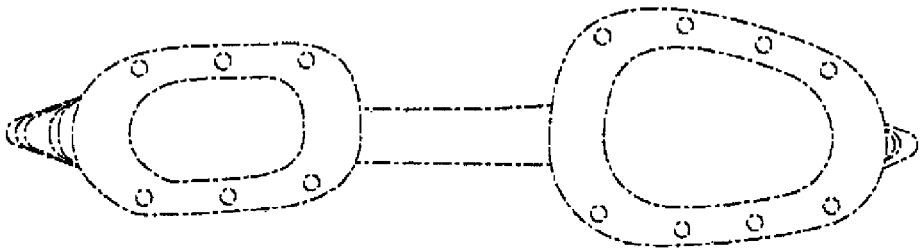
Figure 9:
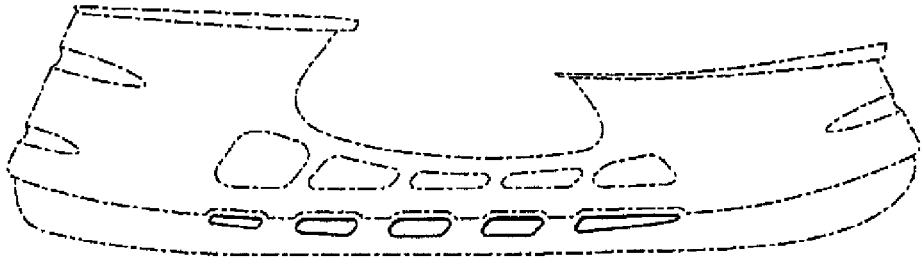
Figure 11:
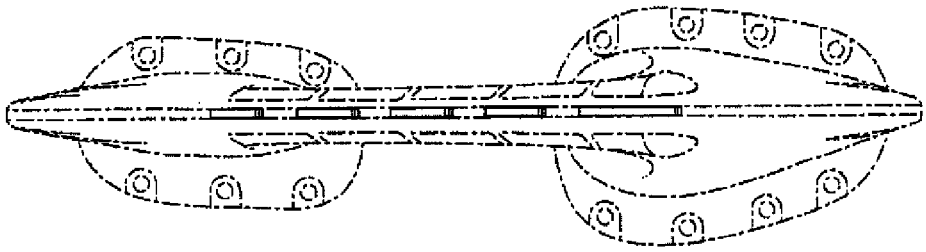
Figure 14:
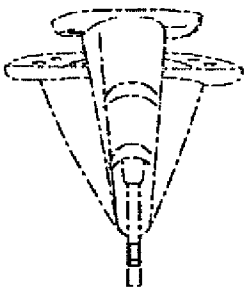
Figure 12:
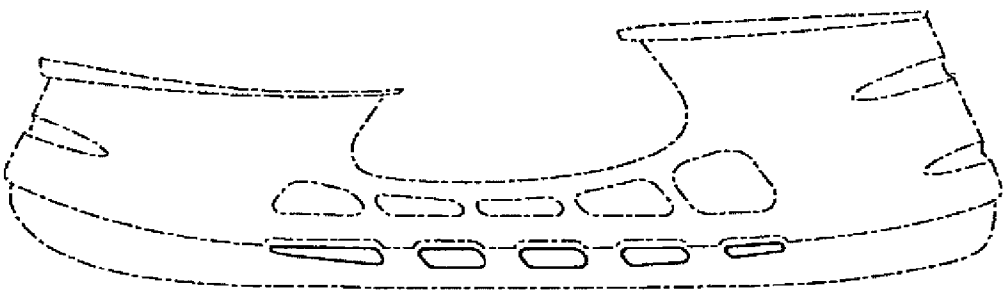
Figure 13:
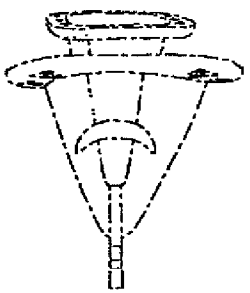

FIG. 1 is a perspective view of an ice skate blade according to the present design;
FIG. 2 is a right side elevational view of the ice skate blade of FIG. 1;
FIG. 3 is a top plan view of the ice skate blade of FIG. 1;
FIG. 4 is a bottom plan view of the ice skate blade of FIG. 1;
FIG. 5 is a rear elevational view of the ice skate blade of FIG. 1;
FIG. 6 is a front elevational view of the ice skate blade of FIG. 1;
FIG. 7 is a left side elevational view of the ice skate blade of FIG. 1;
FIG. 8 is a perspective view of the ice skate blade of FIG. 1 illustrated with an ice skate blade holder in broken lines;
FIG. 9 is a right side elevational view of the ice skate blade of FIG. 8;
FIG. 10 is a top plan view of the ice skate blade of FIG. 8;
FIG. 11 is a bottom plan view of the ice skate blade of FIG. 8;
FIG. 12 is a left side elevational view of the ice skate blade of FIG. 8;
FIG. 13 is a front elevational view of the ice skate blade of FIG. 8; and,
FIG. 14 is a rear elevational view of the ice skate blade of FIG. 8.
The broken lines are shown for illustrative purposes only and form no part of the claimed design.

1 Claim, 4 Drawing Sheets

Matter enclosed in heavy brackets [ ] appears in the original patent but forms no part of this reissue; matter printed in italics indicates the additions made by reissue.

(56) References Cited

U.S. PATENT DOCUMENTS

| | | | | |
|---|---|---|---|---|
| 3,212,786 | A | | 10/1965 | Florjancic et al. |
| 4,074,909 | A | | 2/1978 | Baikie |
| D250,490 | S | * | 12/1978 | Baikie et al. |
| D268,125 | S | * | 3/1983 | Baikie |
| D271,036 | S | * | 10/1983 | Baikie |
| 4,549,742 | A | | 10/1985 | Husak et al. |
| D325,416 | S | * | 4/1992 | Olsen et al. |
| 5,641,169 | A | * | 6/1997 | Bekessy ..... 280/11.18 |
| D414,017 | S | * | 9/1999 | Lefebvre et al. ..... D2/904 |
| D430,251 | S | * | 8/2000 | Graf ..... D21/761 |
| 6,164,667 | A | | 12/2000 | Olivieri |

FOREIGN PATENT DOCUMENTS

| | | |
|---|---|---|
| DE | 41 27 294 C1 | 11/1992 |
| GB | 514214 | 11/1939 |

* cited by examiner

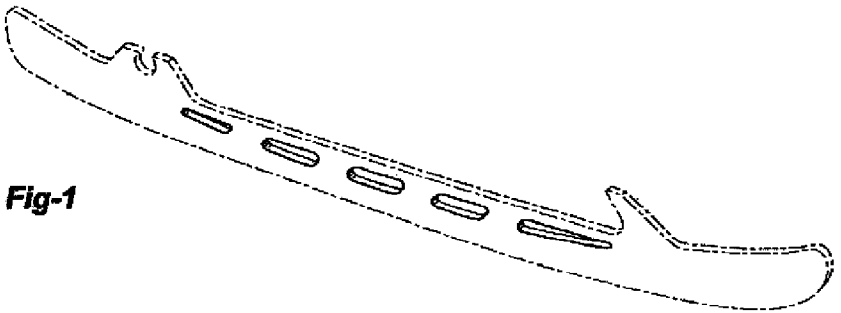
Fig-1
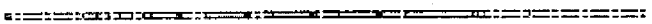
Fig-3
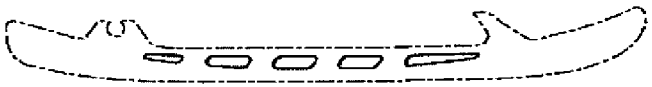
Fig-2
Fig-5
Fig-6
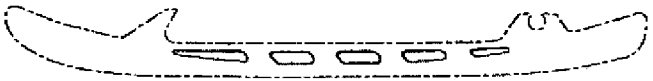
Fig-7
Fig-4

UNITED STATES PATENT AND TRADEMARK OFFICE

CERTIFICATE OF CORRECTION

PATENT NO. : RE44,422 E
APPLICATION NO. : 29/319823
DATED : August 13, 2013
INVENTOR(S) : Labonté et al.

It is certified that error appears in the above-identified patent and that said Letters Patent is hereby corrected as shown below:

On the Title Page Item [60] should read

Continuation of application No. 29/291,961, filed on Sep. 21, 2007, now abandoned, which is a division of application No. 29/213,958, filed on Sep. 23, 2004, now abandoned.

Signed and Sealed this
Nineteenth Day of November, 2013

Teresa Stanek Rea

Teresa Stanek Rea
*Deputy Director of the United States Patent and Trademark Office*

UNITED STATES PATENT AND TRADEMARK OFFICE

CERTIFICATE OF CORRECTION

PATENT NO. : RE44,422 E
APPLICATION NO. : 29/319823
DATED : August 13, 2013
INVENTOR(S) : Labonte et al.

It is certified that error appears in the above-identified patent and that said Letters Patent is hereby corrected as shown below:

On the title page, under 1 Claim, 4 Drawing Sheets

Please delete "Matter enclosed in heavy brackets [ ] appears in the original patent but forms no part of this reissue; matter printed in italics indicates the additions made by reissue."

Signed and Sealed this
Twenty-fourth Day of June, 2014

Michelle K. Lee

Michelle K. Lee
*Deputy Director of the United States Patent and Trademark Office*